United States Patent
Grancharov et al.

(10) Patent No.: US 12,322,123 B2
(45) Date of Patent: Jun. 3, 2025

(54) VISUAL OBJECT DETECTION IN A SEQUENCE OF IMAGES

(71) Applicant: Telefonaktiebolaget LM Ericsson (publ), Stockholm (SE)

(72) Inventors: Volodya Grancharov, Solna (SE); Sigurdur Sverrisson, Kungsängen (SE); Alfredo Fanghella, Stockholm (SE); Manish Sonal, Sollentuna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 459 days.

(21) Appl. No.: 17/774,455

(22) PCT Filed: Nov. 7, 2019

(86) PCT No.: PCT/EP2019/080498
§ 371 (c)(1),
(2) Date: May 4, 2022

(87) PCT Pub. No.: WO2021/089147
PCT Pub. Date: May 14, 2021

(65) Prior Publication Data
US 2022/0392195 A1 Dec. 8, 2022

(51) Int. Cl.
*G06T 7/33* (2017.01)
*G06V 10/20* (2022.01)
(Continued)

(52) U.S. Cl.
CPC .............. *G06T 7/33* (2017.01); *G06V 10/255* (2022.01); *G06V 10/462* (2022.01); *G06V 10/764* (2022.01); *G06V 20/46* (2022.01)

(58) Field of Classification Search
CPC ........ G06T 7/33; G06V 10/462; G06V 20/46; G06V 10/255; G06V 10/764
See application file for complete search history.

(56) References Cited

U.S. PATENT DOCUMENTS

| | | | |
|---|---|---|---|
| 10,817,740 B2 * | 10/2020 | Tariq | G06V 20/56 |
| 2015/0222859 A1 * | 8/2015 | Schweid | G06V 20/52 |
| | | | 348/148 |

(Continued)

OTHER PUBLICATIONS

Greeshma, K. V., and J. Viji Gripsy. "Image classification using HOG and LBP feature descriptors with SVM and CNN." Int J Eng Res Technol 8.4 (2020): 1-4. (Year: 2020).*

(Continued)

*Primary Examiner* — Utpal D Shah
(74) *Attorney, Agent, or Firm* — Rothwell, Figg, Ernst & Manbeck, P.C.

(57) ABSTRACT

There is provided mechanisms for visual object detection in a sequence of images. A method is performed by a visual object detector (200). The method comprises obtaining (S102) a sequence of images of a scene. The sequence of images at least comprises a current image of the scene and a previous image of the scene. The method comprises extracting (S104) a set of objects from the sequence of images by performing visual object detection in the sequence of images. Performing the visual object detection in at least part of the current image is conditioned on a set of conditions being fulfilled. The set of conditions at least pertains to an image-wise descriptor classification score computed for at least one of the previous image and the current image and pertaining to which type of content the scene comprises, and an image overlapping score pertaining to how much overlap in image area there is between the previous image and the current image. The method comprises constructing (S106) an image representation of the scene using the extracted set of objects.

20 Claims, 4 Drawing Sheets

(51) Int. Cl.
    *G06V 10/46* (2022.01)
    *G06V 10/764* (2022.01)
    *G06V 20/40* (2022.01)

(56) References Cited

U.S. PATENT DOCUMENTS

| | | | | |
|---|---|---|---|---|
| 2016/0086336 | A1* | 3/2016 | Lin | H04N 13/282 |
| | | | | 348/50 |
| 2018/0343431 | A1* | 11/2018 | Veldandi | H04N 13/128 |
| 2020/0110926 | A1* | 4/2020 | Csillag | G06F 16/51 |
| 2022/0284608 | A1* | 9/2022 | Sasaki | G06V 10/16 |

OTHER PUBLICATIONS

International Search Report and Written Opinion issued in International Application No. PCT/EP2019/080498, dated Jul. 17, 2020 (12pages).

Yoon, C. et al., "Region of Interest Filter for Real Time Face Detection System", DBpia Jorunal, Jan. 1, 2013 (3 pages).

Pobar, M. et al., "Detection of the leading player in handball scenes using Mask R-CNN and STIPS", ResearchGate, Conference Paper, Mar. 2019 (8 pages).

Shashua, A. et al., "Pedestrian Detection for Driving Assistance Systems: Single-frame Classification and System Level Performance", 2004 IEEE Intelligent Vehicles Symposium, University of Parma, Parma, Italy, Jun. 14-17, 2004 (6 pages).

Enzweiler, M. et al., "Monocular Pedestrian Recognition Using Motion Parallax", 2008 IEEE Intelligent Vehicles Symposium, Eindhoven University of Technology, Eindhoven, The Netherlands, Jun. 4-6, 2008 (6 pages).

Schönberger, J. et al., "Structure-from-Motion Revisited", Published in: 2016 IEEE Conference on Computer Vision and Pattern Recognition (CVPR) (10 pages).

Mur-Artal, R. et al., "ORG-SLAM: a Versatile and Accurate Monocular SLAM System", IEEE Transactions on Robotics, arXiv:1502.00956v2 [cs.RO], Sep. 18, 2015 (18 pages).

Lowe, D. et al., "Oject Recognition from Local Scale-Invariant Features", Proc. of the International Conference on Computer Vision, Corfu, Sep. 1999 (8 pages).

Bay, H. et al., "SURF: Speeded Up Robust Features", ECCV 2006, Part I, LNCS 3951, 2006 (pp. 404-417).

Pillai, S. et al., "Monocular SLAM Supported Object Recognition", arXiv:1506.01732v1 [cs.RO], Jun. 4, 2015 (9 pages).

Zhong, F. et al., "Detect-SLAM: Making Object Detection and SLAM Mutually Beneficial", 2018 IEEE Winter Conference on Applications of Computer Vision, 2018 (10 pages).

Matas, J. et al., "Robust Wide Baseline Stereo from Maximally Stable Extremal Regions", BMVC 2002 (10 pages).

Alcantarilla, P. et al., "Fast Explicit Diffusion for Accelerated Features in Nonlinear Scale Spaces" 2013 (11 pages).

Sivic, J. et al., "Video Google: A Text Retrieval Approach to Object Matching in Videos", Proceedings of the Ninth IEEE International Conference on Computer Vision, 2003 (8 pages).

Turner, JT et al., "Keypoint Density-based Region Proposal for Fine-Garined Object Detection and Classification using Regions with Convolutional Neural Network Features", Mar. 2016 (9 pages).

* cited by examiner

VISUAL OBJECT DETECTION IN A SEQUENCE OF IMAGES

CROSS REFERENCE TO RELATED APPLICATIONS

This application is a 35 U.S.C. § 371 National Stage of International Patent Application No. PCT/EP2019/080498, filed Nov. 7, 2019.

TECHNICAL FIELD

Embodiments presented herein relate to a method, a visual object detector, a computer program, and a computer program product for visual object detection in a sequence of images.

BACKGROUND

Image registration might generally involve transforming different sets of data into one coordinate system. The sets of data might comprise multiple images as captured from different sensors, at different times, depths, or viewpoints. Image registration might be used in application such as computer vision, medical imaging, military automatic target recognition, compiling and analyzing images and data from satellites, super resolution applications, creating a panoramic view of a scene, creating a three-dimensional (3D) model of the scene, etc.

Some aspects of image registration consider the problem of identifying objects in the images. This process is commonly referred to as visual object detection. Visual object detection generally refers to detection instances of semantic objects of a certain class (such as humans, buildings, or cars) in digital images and videos.

Methods for object detection generally fall into either machine learning-based approaches or deep learning-based approaches. For Machine Learning approaches, it becomes necessary to first define features, then using a technique, such as support vector machine (SVM), to perform the classification. Deep learning techniques are able to perform end-to-end object detection without specifically defining features, and are typically based on convolutional neural networks (CNN). CNN based object detectors are accurate but require significant amount of computational and memory resources, which is a challenge for many implementations.

One way to reduce the computational and memory resources is to periodically (such as once per every M:th image frame in a sequence of images or once per every N:th millisecond, where the values of M and N are configurable and might depend on the application and the content of the sequence of images) run a lightweight object detector to determine whether there is a need to run a more advanced object detector, such as CNN based object detector or not. Although the object detector that is run is lightweight, it still consumes computational resources. Further, since it is not performed for every image frame, it could be that object is missed, and careful tuning of the value of M and/or N is therefore needed. All this results in cumbersome use of the lightweight object detector.

However, there is still a need for more computational and memory efficient object detection.

SUMMARY

An object of embodiments herein is to provide efficient object detection, especially in terms of computational and memory resources.

According to a first aspect there is presented a method for visual object detection in a sequence of images. The method is performed by a visual object detector. The method comprises obtaining a sequence of images of a scene. The sequence of images at least comprises a current image of the scene and a previous image of the scene. The method comprises extracting a set of objects from the sequence of images by performing visual object detection in the sequence of images. Performing the visual object detection in at least part of the current image is conditioned on a set of conditions being fulfilled. The set of conditions at least pertains to an image-wise descriptor classification score computed for at least one of the previous image and the current image and pertaining to which type of content the scene comprises, and an image overlapping score pertaining to how much overlap in image area there is between the previous image and the current image. The method comprises constructing an image representation of the scene using the extracted set of objects.

According to a second aspect there is presented a visual object detector for visual object detection in a sequence of images. The visual object detector comprises processing circuitry. The processing circuitry is configured to cause the visual object detector to obtain a sequence of images of a scene. The sequence of images at least comprises a current image of the scene and a previous image of the scene. sequence of images. The visual object detector comprises processing circuitry. The processing circuitry is configured to cause the visual object detector to extract a set of objects from the sequence of images by performing visual object detection in the sequence of images. Performing the visual object detection in at least part of the current image is conditioned on a set of conditions being fulfilled. The set of conditions at least pertains to an image-wise descriptor classification score computed for at least one of the previous image and the current image and pertaining to which type of content the scene comprises, and an image overlapping score pertaining to how much overlap in image area there is between the previous image and the current image. The processing circuitry is configured to cause the visual object detector to construct an image representation of the scene using the extracted set of objects.

According to a third aspect there is presented a visual object detector for visual object detection in a sequence of images. The visual object detector comprises an obtain module configured to obtain a sequence of images of a scene. The sequence of images at least comprises a current image of the scene and a previous image of the scene. The visual object detector comprises an extract module configured to extract a set of objects from the sequence of images by performing visual object detection in the sequence of images. Performing the visual object detection in at least part of the current image is conditioned on a set of conditions being fulfilled. The set of conditions at least pertains to an image-wise descriptor classification score computed for at least one of the previous image and the current image and pertaining to which type of content the scene comprises, and an image overlapping score pertaining to how much overlap in image area there is between the previous image and the current image. The visual object detector comprises a construct module configured to construct an image representation of the scene using the extracted set of objects.

According to a fourth aspect there is presented a computer program for visual object detection in a sequence of images, the computer program comprising computer program code which, when run on a visual object detector, causes the visual object detector 200 to perform a method according to the first aspect.

According to a fifth aspect there is presented a computer program product comprising a computer program according to the fourth aspect and a computer readable storage medium on which the computer program is stored. The computer readable storage medium could be a non-transitory computer readable storage medium.

Advantageously, these aspects provide efficient object detection, especially in terms of computational and memory resources.

Advantageously, these aspects enable efficient object detection to be performed on devices having comparatively low computational and power resources, such as mobile terminal devices.

Advantageously, the visual object detector can be made part of, or integrated in, mobile terminal devices.

Advantageously, the defined set of conditions enable efficient determination as to when the visual object detection is to be performed and when the visual object detection is not to be performed.

Advantageously, the proposed visual object detection can be implemented in many types of object detection systems to reduce the computing power required. This results in a faster, cheaper and/or more energy efficient system.

Other objectives, features and advantages of the enclosed embodiments will be apparent from the following detailed disclosure, from the attached dependent claims as well as from the drawings.

Generally, all terms used in the claims are to be interpreted according to their ordinary meaning in the technical field, unless explicitly defined otherwise herein. All references to "a/an/the element, apparatus, component, means, module, step, etc." are to be interpreted openly as referring to at least one instance of the element, apparatus, component, means, module, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which.

DETAILED DESCRIPTION

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

The embodiments disclosed herein relate to mechanisms for visual object detection in a sequence of images. In order to obtain such mechanisms there is provided a visual object detector, a method performed by the visual object detector, a computer program product comprising code, for example in the form of a computer program, that when run on a visual object detector, causes the visual object detector to perform the method.

As noted above there is still a need for more computational and memory efficient object detection.

At least some of the herein disclosed embodiments are therefore based on performing visual object detection being conditioned on a set of conditions being fulfilled. These set of conditions will be presented below. First it is checked whether the set of conditions are fulfilled or not, and then, visual object detection is performed for an image only when the set of conditions are fulfilled, whereas no visual object detection for the image is performed when the set of conditions are not fulfilled. The check of whether the set of conditions are fulfilled or not provides an efficient mechanism for determining whether visual object detection is to be performed or not. Thereby, images for which performing visual object detection would not be useful could easily be filtered out.

Figure 1:
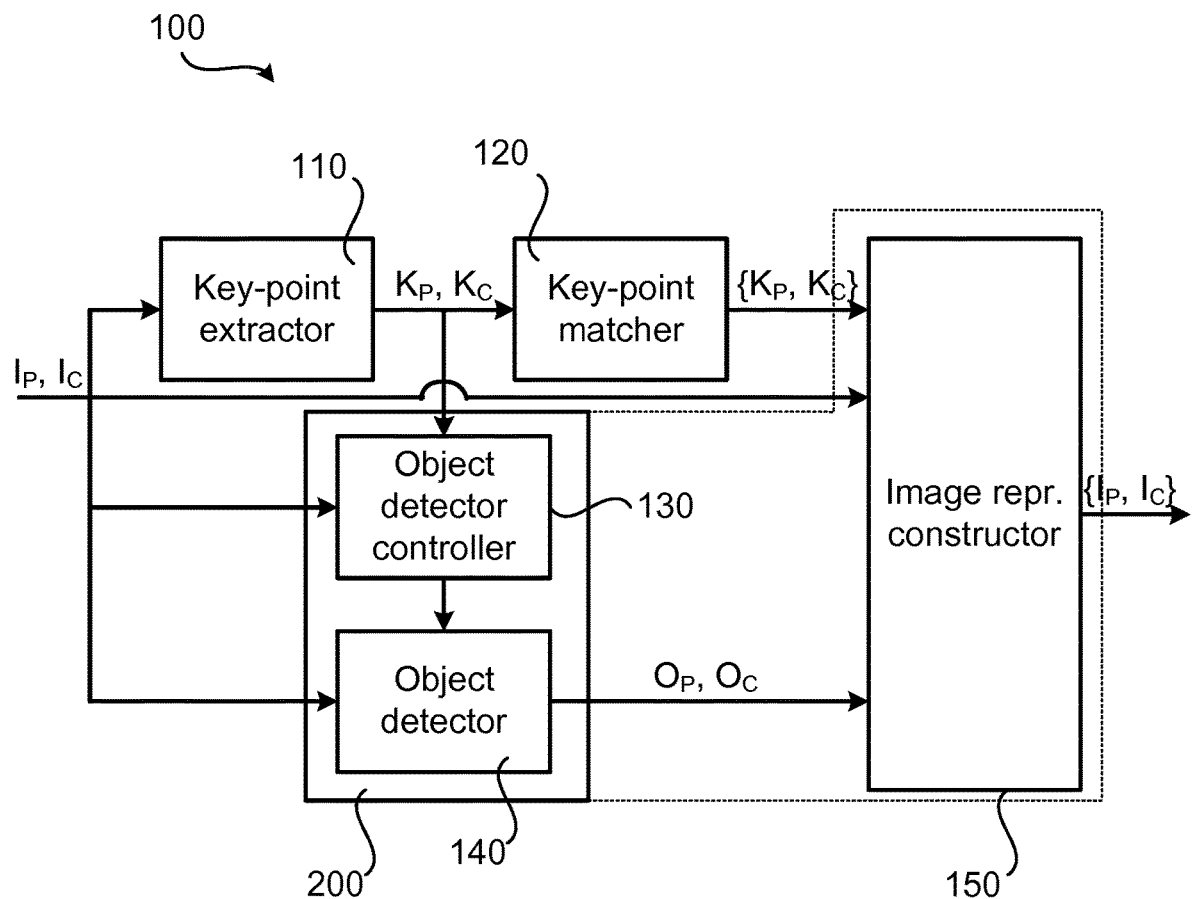
FIG. 1 is a schematic diagram illustrating an image registration system according to embodiments.

FIG. 1 is a schematic diagram illustrating an image registration system 100 where embodiments presented herein can be applied. Without loss of generality, the image registration system 100 illustrates how an image representation $\{I_p, I_c\}$ is formed from a previous image $I_p$ and a current image $I_c$.

The image registration system 100 comprises a key-point extractor 110 configured to extract key-points $K_p$ from the previous image $I_p$ and to extract key-points $K_c$ from the current image $I_c$. In some examples the key-points are represented by spatial coordinates X and the corresponding descriptor D, i.e., K=[X, D]. The descriptor of a given key-point could describe statistics, in terms of gradients, texture, etc., in a surrounding of the given key-point. One purpose of the key-point descriptors is to characterize the image area in the vicinity of the key-points. The descriptor D of a key-point is typically provided as a scalar or a finite vector, which summarizes the properties of that key-point. There are different types of available descriptors. As an example, the speeded up robust features (SURF) descriptor is a 64-dimensional vector of floating-point values based on the sum of the Haar wavelet response around the particular key-point. As an example, the scale-invariant feature transform (SIFT) descriptor is a 128-dimensional vector calculated by aggregation histograms of gradient magnitude around the key-point. The histogram of oriented gradients (HOG) descriptor describes local appearance around a key-point by means of concatenated histograms of gradient directions. The Binary Robust Independent Elementary Features (BRIEF) descriptor is a binary version of the SIFT descriptor in the form of a 128-bit number. Beyond capturing the intensity distribution of the pixels within the neighborhood, the descriptors could be based on color gradients, dominant color in the area, etc. As an example, closeness of key-point descriptors could be measured by means of Euclidean vector distance.

The image registration system 100 comprises a key-point matcher 120 configured to match the key-points $K_p$ of the previous image $I_p$ to the key-points $K_c$ of the current image $I_c$ and thus find matching key-points $\{K_p, K_c\}$.

The image registration system 100 comprises an object detector 140. The object detector 140 is controlled by an object detector controller 130. The object detector 140 is configured to detect objects $O_p$ in the previous image $I_p$ and to detect objects $O_c$ in the current image $I_c$. In some examples the objects are represented by a location B (for example given in terms of bounding box coordinates) and an object class C, i.e., O=[B, C].

The image registration system 100 comprises an object detector controller 130 configured to, by using the key-points $K_p$ and $K_c$, control how the object detector 140 detects the objects $O_c$ in the current image $I_c$. The object detector controller 130 and the object detector 140 collectively constitute a visual object detector 200.

The image registration system 100 comprises an image representation constructor 150 configured to, from the matching key-points $\{K_p, K_c\}$ as found by the key-point matcher 120, the current image $I_c$, the previous image $I_p$, the objects $O_c$ from the current image $I_c$, and the objects $O_p$ from the previous image $I_p$, construct the image representation $\{I_p, I_c\}$ of the current image $I_c$ and the previous image $I_p$.

Figure 2:
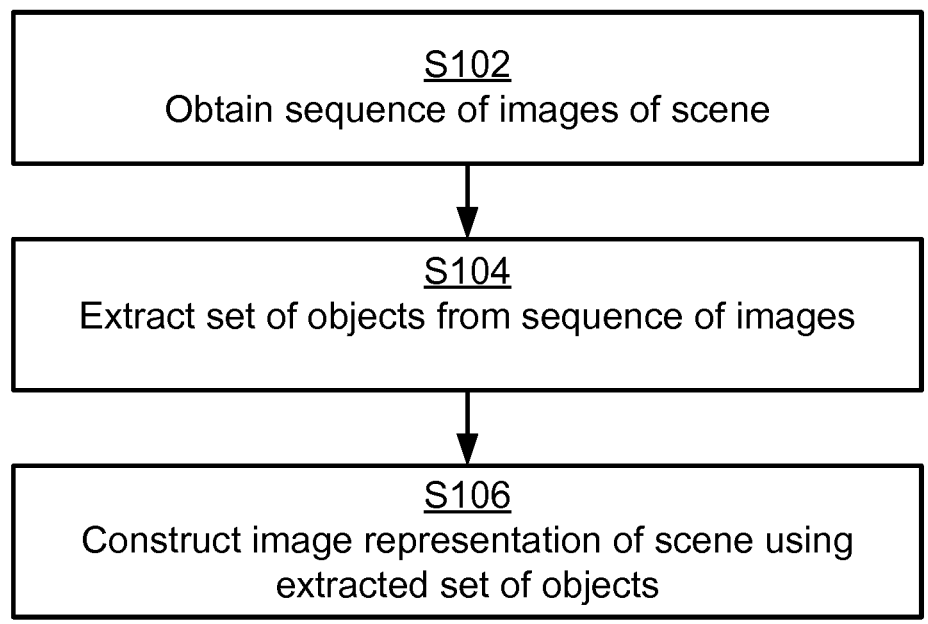
FIG. 2 is a flowchart of methods according to embodiments.

FIG. 2 is a flowchart illustrating embodiments of methods for visual object detection in a sequence of images. The methods are performed by the visual object detector 200. The methods are advantageously provided as computer programs 620.

S102: The visual object detector 200 obtains a sequence of images of a scene. The sequence of images at least comprises a current image of the scene and a previous image of the scene.

S104: The visual object detector 200 extracts a set of objects from the sequence of images. The set of objects is extracted by the visual object detector 200 performing visual object detection in the sequence of images. Performing the visual object detection in at least part of the current image is conditioned on a set of conditions being fulfilled. The set of conditions at least pertain to an image-wise descriptor classification score. The image-wise descriptor classification score is computed for at least one of the previous image and the current image. The image-wise descriptor classification score pertains to which type of content the scene comprises. Further aspects of the image-wise descriptor classification score will be disclosed below. The set of conditions further at least pertain to an image overlapping score. The image overlapping score pertains to how much overlap in image area there is between the previous image and the current image. Further aspects of the image overlapping score will be disclosed below.

S106: The visual object detector 200 constructs an image representation of the scene using the extracted set of objects.

Embodiments relating to further details of visual object detection in a sequence of images as performed by the visual object detector 200 will now be disclosed.

As specified above, the image-wise descriptor classification score pertains to which type of content the scene comprises. In this respect, a first scene having a first type of content will thus produce a different image-wise descriptor classification score than a second scene having a second type of content which is different from the first type of content. For example, a scene where the content is a country landscape will produce a different image-wise descriptor classification score than a scene where the content is electric equipment. In this respect, the computation of the image-wise descriptor classification score is adjustable such that a comparatively high value of the image-wise descriptor classification score is produced only for a scene having content of a certain type. For example, if the visual object detector 200 is applied to detect electric equipment, then the computation of the image-wise descriptor classification score is adjusted such that a scene where the content indeed is electric equipment will produce a higher image-wise descriptor classification score than a scene where the content is not electric equipment (such as a country landscape).

As in the illustrative example of FIG. 1, key-points for each image might be extracted. Some part, or parts, of the scene contains more key-points than others, for example depending on what type of objects the scene comprises. Information of the key-points might be considered in the set of conditions according to which the visual object detection is conditioned.

For an example, if there are many key-points indicative of an object of interest being present in the scene, which are the typical target of the visual object detector. Conversely, a scene with very few of key-points is likely to lack objects of interest. In particular, in some embodiments, key-points are extracted in the previous image and in the current image, and the set of conditions further pertains to a key-point score based on number of key-points in at least one of the previous image and the current image.

Whether to perform the visual object detection or not might then be based on comparing the number of key-points N to a predefined threshold $\theta_N$. If $N<\theta_N$, then the visual object detection might not be performed in the current image. In particular, in some embodiments, the visual object detection in the at least part of the current image is performed only when the key-point score is larger than (or at least not smaller than) a key-point number threshold value $\theta$.

In some aspects, the value of the key-point number threshold value depends on the descriptors; different feature extractors produce different number of key-points. For example, the number of key-points decreases not only with lack of texture, but also due to other factors, such as motion blur, etc. In particular, in some embodiments, the key-point number threshold value depends on which type of key-point extractor is used to extract the key-points.

As in FIG. 1, the image representation of the scene might further be constructed using the key-points.

Using only the number of key-points to decide whether to perform the visual object detection or not might be insufficient for images that are rich in textures and edges. For this purpose the key-points descriptors are used to define a global descriptor classification score for the whole image, as defined by the image-wise descriptor classification score. Whether to perform the visual object detection or not might then be determined by comparing the global descriptor classification score to a threshold. In particular, in some embodiments, the visual object detection in the at least part of the current image is performed only when the image-wise descriptor classification score is larger than (or at least not smaller than) a classification score threshold value.

In some aspects, whether to perform the visual object detection or not is determined by comparing the global descriptor classification score to a threshold. In particular, in some embodiments, each key-point has a descriptor selected from a set of descriptor types, and the image-wise descriptor classification score threshold value depends on how many of the key-points that have descriptors of a given subset of the descriptor types.

In some aspects, an image-wise descriptor is built from the descriptors of the key-points extracted from one of the previous image and the current image. The image-wise descriptor indicates whether an object of interest is present in either the previous image or the current image or both. In some embodiments, the image-wise descriptor classification score is determined from the image-wise descriptor. The global, or image-wise, descriptor classification score might be generated from the key-point descriptors using the Bag of Words (BoW) approach.

A statistical classifier might be trained offline to recognize the type of objects that are to be detected based on the descriptors of these types of objects. At run time a Support Vector Machine (SVM) might give a very low complex indication if the object of interest is present the image, and indicate as to whether CNN based object detection should be run to confirm presence of the object in the image and accurately estimate boundaries of the objects. Thus, the image-wise descriptor might be built using a Support Vector Machine (SVM).

Figure 3:
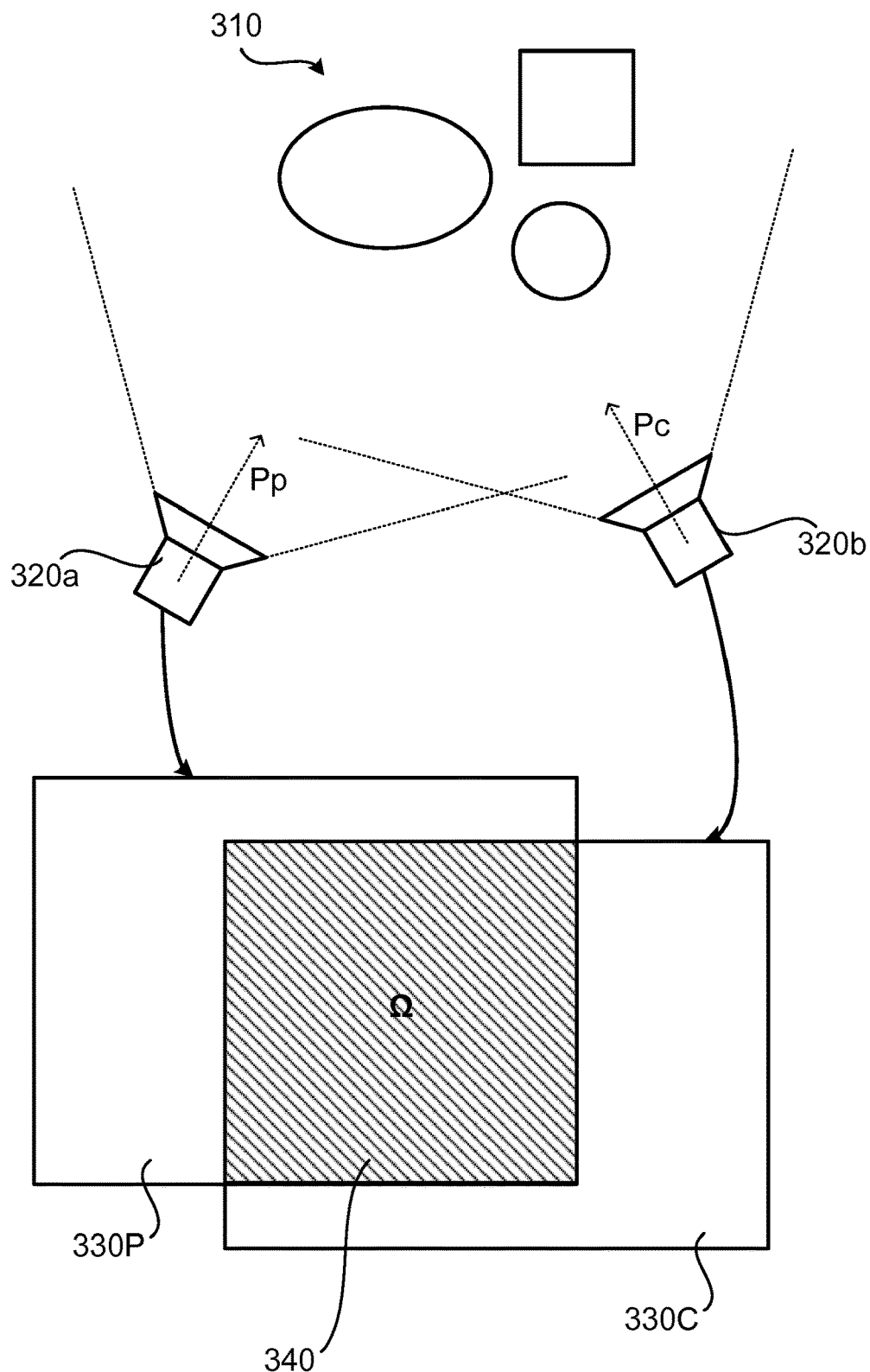
FIG. 3 schematically illustrates a scene and images being captured of the scene according to an embodiment.

Intermediate reference is made to FIG. 3. FIG. 3 schematically illustrates a scene 310 and images 330P, 330C captured of the scene 310 by one or more image capturing units 320$a$, 320$b$ for a previous sensor pose $P_p$ and a current sensor pose $P_c$, respectively. In some aspects, each of the current image and the previous image might thus have been captured for a respective sensor pose $P_p$, $P_c$. The overlap in image area between image 330P (representing the previous image) and image 330C (representing the current image) is denoted $\Omega$, and defines the dashed area 340. Assume that visual object detection was applied in the previous image and the objects $O_p$ thus are readily available. As noted above, performing the visual object detection in at least part of the current image is conditioned on a set of conditions being fulfilled, where the set of conditions at least pertains to an image overlapping score relating to how much overlap in image area there is between the previous image and the current image.

In some aspects, the overlap in image area should be as small as possible (i.e., $\Omega$ should be as small as possible). One motivation of this is that if the overlap in image area is relatively small, then a result of the visual object detection as performed for the previous image will also apply for the current image and hence performing the visual object detection in the current image will result in few new objects, or even not any new objects, to be detected. The following logic could thus be applied to the current image: Activate the visual object detection only when $\Omega<\theta_{\Omega 1}$, where $\theta_{\Omega 1}$ is an image overlap threshold value. In particular, in some embodiments, the visual object detection in the at least part of the current image is thus performed only when the image overlapping score, and thus the overlap in image area, is smaller than an image overlap threshold value. In some embodiments, the image overlap threshold value depends on how much the sensor pose differs between the current image and the previous image (i.e., how much $P_c$ differs from $P_p$). The image overlap threshold value might further be related to the average size of objects of interests (as they appear in the visual scene).

In some aspects, the overlap in image area should be as large as possible (i.e., $\Omega$ should be as large as possible). One motivation of this is that if the overlap in image area is relatively large, this could be an indication that the image capturing unit points in a direction of a scene already captured. This could be useful if the scene has been updated by one or more physical object having been removed from the scene or one or more objects having been added to the scene and thus any such update can be identified by performing visual object detection in the current image. The following logic could thus be applied to the current image: Activate the visual object detection only when $\Omega>\theta_{\Omega 2}$, where $\theta_{\Omega 2}$ is an image overlap threshold value. In particular, in some embodiments, the visual object detection in the at least part of the current image is performed only when the image overlapping score, and thus overlap in image area, is larger than (or at least not smaller than) an image overlap threshold value. In some cases, $\theta_{\Omega 1}=\theta_{\Omega 2}$. However, in other cases $\theta_{\Omega 1}\neq\theta_{\Omega 2}$.

There could be different ways to determine the overlap in image area and thus to determine the value of $\Omega$. In some examples, the overlap in image area is determined from at least one of the key-point score, the image-wise descriptor classification score, and how much the sensor pose differs between the current image and the previous image.

As disclosed above, the visual object detector 200 in S106 constructs an image representation of the scene using the extracted set of objects. When the set of conditions is fulfilled, the visual object detection is thus performed in at least part of the current image. The current image is then, when the image representation is constructed in S106, represented by objects as detected in the at least part of the current image. However, when the set of conditions are not fulfilled, the visual object detection is not performed in at least part of the current image. The current image can then, when the image representation is constructed in S106, not be represented by objects as detected in the at least part of the current image since visual object detection has not been performed for the current image. Instead, the current image might, when the image representation is constructed in S106, be represented either by objects as detected in the previous image or by an empty set of objects (i.e., by no objects at all).

There could be different relations between the previous image and the current image in the sequence of images. In some embodiments, the previous image and the current image represent time-wise adjacently captured images in the sequence of images. In other embodiments, the previous image and the current image are time-wise separated by at least one intermediate image in the sequence of images. However, the herein disclosed embodiments are also applicable to images produced at the same time instant, but from different sources, e.g., from two different cameras. Further, the herein disclosed embodiments are also applicable beyond usage of single camera; stereo cameras, or additional sensors, could be also used, which includes depth cameras, thermal cameras, or equipment for active scanning, such as laser or lidar.

There are different applications where the image representation of the scene could be used. In some examples, the image representation of the scene is a panoramic view comprising, or represented by, the previous image 330P and the current image 330C. In some examples, the image representation of the scene is a 3D model comprising, or represented by, the previous image 330P and the current image 330C. In further examples, image representation of the scene could be used in medical imaging (where multiple images of human organs or tumours have to be stitched, or in image super resolution applications, where a higher resolution two-dimensional (2D) scene from a set of low resolution 2D images is constructed.

Figure 4:
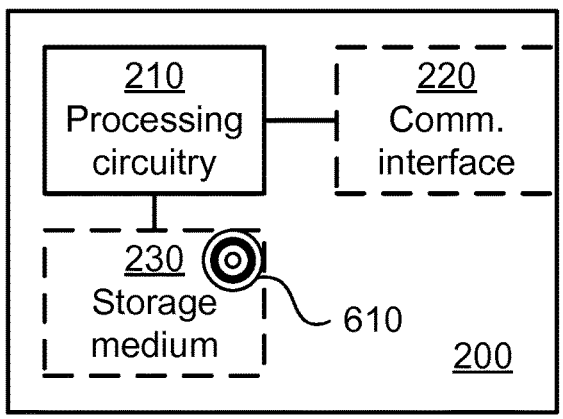
FIG. 4 is a schematic diagram showing functional units of a visual object detector according to an embodiment.

FIG. 4 schematically illustrates, in terms of a number of functional units, the components of a visual object detector 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 610 (as in FIG. 6), e.g. in the form of a storage medium 230. The processing circuitry 210 may further be provided as at least one application specific integrated circuit (ASIC), or field programmable gate array (FPGA).

Particularly, the processing circuitry 210 is configured to cause the visual object detector 200 to perform a set of operations, or steps, as disclosed above. For example, the storage medium 230 may store the set of operations, and the processing circuitry 210 may be configured to retrieve the set of operations from the storage medium 230 to cause the visual object detector 200 to perform the set of operations. The set of operations may be provided as a set of executable instructions.

Thus the processing circuitry 210 is thereby arranged to execute methods as herein disclosed. The storage medium 230 may also comprise persistent storage, which, for example, can be any single one or combination of magnetic memory, optical memory, solid state memory or even remotely mounted memory. The visual object detector 200 may further comprise a communications interface 220 at least configured for communications with other entities, functions, nodes and devices, as illustrated in FIG. 1. As such the communications interface 220 may comprise one or more transmitters and receivers, comprising analogue and digital components. The processing circuitry 210 controls the general operation of the visual object detector 200 e.g. by sending data and control signals to the communications interface 220 and the storage medium 230, by receiving data and reports from the communications interface 220, and by retrieving data and instructions from the storage medium 230. Other components, as well as the related functionality, of the visual object detector 200 are omitted in order not to obscure the concepts presented herein.

Figure 5:
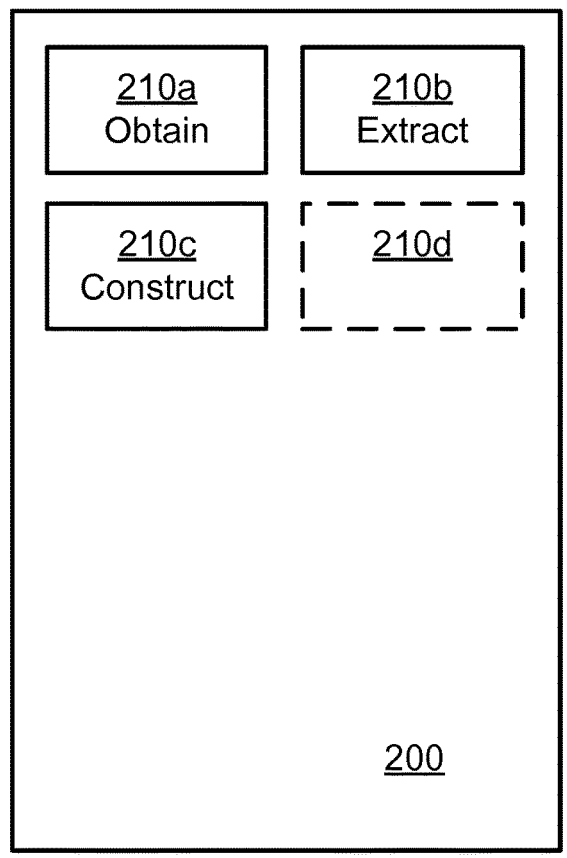
FIG. 5 is a schematic diagram showing functional modules of a visual object detector according to an embodiment.

FIG. 5 schematically illustrates, in terms of a number of functional modules, the components of a visual object detector 200 according to an embodiment. The visual object detector 200 of FIG. 5 comprises a number of functional modules; an obtain module 210a configured to perform step S102, an extract module 210b configured to perform step S104, and a construct module 210c configured to perform step S106. The visual object detector 200 of FIG. 5 may further comprise a number of optional functional modules, as represented by functional module 210d. In general terms, each functional module 210a-210d may in one embodiment be implemented only in hardware and in another embodiment with the help of software, i.e., the latter embodiment having computer program instructions stored on the storage medium 230 which when run on the processing circuitry makes the visual object detector 200 perform the corresponding steps mentioned above in conjunction with FIG. 5. It should also be mentioned that even though the modules correspond to parts of a computer program, they do not need to be separate modules therein, but the way in which they are implemented in software is dependent on the programming language used. Preferably, one or more or all functional modules 210a-210d may be implemented by the processing circuitry 210, possibly in cooperation with the communications interface 220 and/or the storage medium 230. The processing circuitry 210 may thus be configured to from the storage medium 230 fetch instructions as provided by a functional module 210a-210d and to execute these instructions, thereby performing any steps as disclosed herein.

The visual object detector 200 might be integrated with, be part of, or collocated with, an image processing device, such as a graphics processing unit (GPU), a visual processing unit (VPU) or a tensor processing unit (TPU), and/or be provided in any of: a video card, a mother board, an embedded system, a mobile phone, a vehicle, a personal computer, a workstation, or a game console.

A first portion of the instructions performed by the visual object detector 200 may be executed in a first device, and a second portion of the of the instructions performed by the visual object detector 200 may be executed in a second device; the herein disclosed embodiments are not limited to any particular number of devices on which the instructions performed by the visual object detector 200 may be executed. Hence, the methods according to the herein disclosed embodiments are suitable to be performed by a visual object detector 200 residing in a cloud computational environment. Therefore, although a single processing circuitry 210 is illustrated in FIG. 4 the processing circuitry 210 may be distributed among a plurality of devices, or nodes. The same applies to the functional modules 210a-210d of FIG. 5 and the computer program 620 of FIG. 6.

Figure 6:
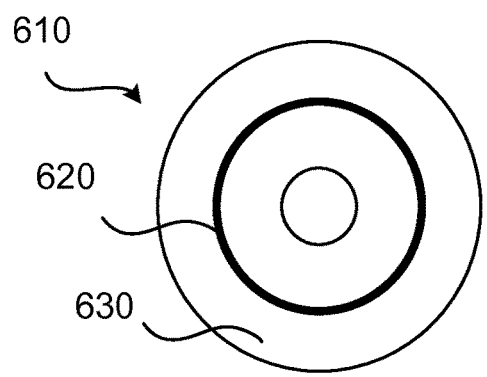
FIG. 6 shows one example of a computer program product comprising computer readable storage medium according to an embodiment.

FIG. 6 shows one example of a computer program product 610 comprising computer readable storage medium 630. On this computer readable storage medium 630, a computer program 620 can be stored, which computer program 620 can cause the processing circuitry 210 and thereto operatively coupled entities and devices, such as the communications interface 220 and the storage medium 230, to execute methods according to embodiments described herein. The computer program 620 and/or computer program product 610 may thus provide means for performing any steps as herein disclosed.

In the example of FIG. 6, the computer program product 610 is illustrated as an optical disc, such as a CD (compact disc) or a DVD (digital versatile disc) or a Blu-Ray disc. The computer program product 610 could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 620 is here schematically shown as a track on the depicted optical disk, the computer program 620 can be stored in any way which is suitable for the computer program product 610.

The inventive concept has mainly been described above with reference to a few embodiments. However, as is readily appreciated by a person skilled in the art, other embodiments than the ones disclosed above are equally possible within the scope of the inventive concept, as defined by the appended patent claims.

The invention claimed is:

1. A method for visual object detection in a sequence of images, the method being performed by a visual object detector, the method comprising:
obtaining a sequence of images of a scene, the sequence of images at least comprising a current image of the scene and a previous image of the scene;

extracting a set of objects from the sequence of images, wherein the extracting comprises:

obtaining an image-wise descriptor classification score for the previous image or for the current image and pertaining to which type of content the scene comprises;

obtaining an image overlapping score pertaining to how much overlap in image area there is between the previous image and the current image;

based on the image-wise descriptor classification score and the image overlapping score, determining whether a criteria is met; and as a result of determining that the criteria is met, performing visual object detection in at least part of the current image; and constructing an image representation of the scene using the extracted set of objects.

2. A visual object detector for visual object detection in a sequence of images, the visual object detector comprising:

processing circuitry, the processing circuitry being configured to cause the visual object detector to:

obtain a sequence of images of a scene, the sequence of images at least comprising a current image of the scene and a previous image of the scene;

extract a set of objects from the sequence of images, wherein the extracting comprises to:

obtain an image-wise descriptor classification score for the previous image or for the current image and pertaining to which type of content the scene comprises;

obtain an image overlapping score pertaining to how much overlap in image area there is between the previous image and the current image;

based on the image-wise descriptor classification score and the image overlapping score, determine whether a criteria is met; and as a result of determining that the criteria is met, perform visual object detection in at least part of the current image; and construct an image representation of the scene using the extracted set of objects.

3. The visual object detector of claim 2, wherein the extracting comprises to:

extract key-points from the previous image and from the current image; and obtain a key-point score based on a number of key-points in the previous image or the current image.

4. The visual object detector of claim 3, wherein the criteria comprises the key-point score being larger than a key-point number threshold value.

5. The visual object detector of claim 4, wherein the key-points are extracted using a key-point extractor having a type and the key-point number threshold value depends on the type of key-point extractor.

6. The visual object detector of claim 3, wherein the image representation of the scene is constructed using the key-points.

7. The visual object detector of claim 2, wherein the criteria comprises the image-wise descriptor classification score being larger than a classification score threshold value.

8. The visual object detector of claim 2, wherein the extracting comprises to:

extract key-points from the previous image and from the current image; and obtain a number of key-points in the previous image or the current image, wherein the criteria comprises the image-wise descriptor classification score being larger than a classification score threshold value, each key-point has a descriptor selected from a set of descriptor types, and the image-wise descriptor classification score threshold value is based on a number of the key-points that have descriptors of a subset of the descriptor types.

9. The visual object detector of claim 8, wherein the extracting comprises to:

generate an image-wise descriptor based on the descriptors of the key-points extracted from the previous image or the current image, wherein the image-wise descriptor indicates whether an object of interest is present in the previous image or the current image, and wherein the image-wise descriptor classification score is determined based on the image-wise descriptor.

10. The visual object detector of claim 9, wherein the image-wise descriptor is generated using a Support Vector Machine.

11. The visual object detector of claim 2, wherein the criteria comprises the image overlapping score being smaller than an image overlap threshold value.

12. The visual object detector of claim 11, wherein each of the current image and the previous image has been captured for a respective sensor pose, and the image overlap threshold value is based on an amount the sensor pose differs between the current image and the previous image.

13. The visual object detector of claim 3, wherein the criteria comprises the image overlapping score being larger than an image overlap threshold value.

14. The visual object detector of claim 13, wherein each of the current image and the previous image has been captured for a respective sensor pose, and the overlap in image area is determined from the key-point score, the image-wise descriptor classification score, or an amount the sensor pose differs between the current image and the previous image.

15. The visual object detector of claim 2, constructing the image representation comprises representing the current image using objects as detected in the at least part of the current image.

16. The visual object detector of claim 2, wherein constructing the image representation comprises representing the current image using either objects as detected in the previous image or by an empty set of objects as a result of determining that the criteria is not met.

17. The visual object detector of claim 2, wherein the previous image and the current image represent time-wise adjacently captured images in the sequence of images.

18. The visual object detector of claim 2, wherein the previous image and the current image are time-wise separated by at least one intermediate image in the sequence of images.

19. The visual object detector of claim 2, wherein the image representation of the scene is a panoramic view comprising, or represented by, the previous image and the current image.

20. The visual object detector of claim 2, wherein the image representation of the scene is a 3D model comprising, or represented by, the previous image and the current image.

* * * * *